(12) United States Patent
Bawolek et al.

(10) Patent No.: US 6,211,521 B1
(45) Date of Patent: Apr. 3, 2001

(54) INFRARED PIXEL SENSOR AND INFRARED SIGNAL CORRECTION

(75) Inventors: Edward J. Bawolek, Chandler; Jean-Charles Korta, Mesa; Walter J. Mack, Chandler, all of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/041,976

(22) Filed: Mar. 13, 1998

(51) Int. Cl.⁷ ................................................. H01J 40/14
(52) U.S. Cl. .................. 250/339.02; 250/208.1; 250/226
(58) Field of Search ................ 250/339.02, 339.01, 250/339.05, 340, 226, 208.1; 348/274, 273

(56) References Cited

U.S. PATENT DOCUMENTS 5,929,432 * 7/1999 Yamakawa .................... 250/208.1

\* cited by examiner

Primary Examiner—Seungsook Ham
Assistant Examiner—Richard Hanig
(74) Attorney, Agent, or Firm—Seth Kalson

(57) ABSTRACT

A infrared pixel sensor comprising a pixel circuit and a composite infrared pass filter comprising a plurality of filters, wherein each filter belonging to the plurality of filters are substantially transparent to infrared radiation and have a visible pass spectrum so that the composite infrared pass filter is substantially opaque to visible light. Signals from infrared pixel sensors are subtracted from color pixel sensors to correct for infrared radiation in the image signal without the need for an infrared blocking filter.

8 Claims, 8 Drawing Sheets

| R | G | B | IR (R+B) |
|---|---|---|---|
| G | B | IR (R+B) | R |
| B | IR (R+B) | R | G |
| IR (R+B) | R | G | B |

Fig. 6

INFRARED PIXEL SENSOR AND INFRARED SIGNAL CORRECTION

FIELD OF INVENTION

The present invention relates to infrared pass filters and pixel sensors, and more particularly, to infrared pass filters and infrared signal correction in an image.

BACKGROUND

Imaging sensors or devices based on silicon technology typically require the use of an infrared blocking element somewhere in the optical chain. The purpose of this element is to prevent infrared radiation (IR) or light (typically considered to be light with a wavelength longer than 780 nm) from entering the imaging array. Silicon-based devices will typically be sensitive to light with wavelengths up to approximately 1200 nm. If the IR is permitted to enter the array, the device will respond to the IR, and generate an output image signal. Since the purpose of an imaging system (in this context) is to create a representation of the visible light present in a scene, the IR will introduce a false response and distort the image. In a monochrome (black and white) imaging system, the result can be an obviously distorted rendition. For example, foliage and human skin tones may appear unusually light. In a color imaging system, the introduction of IR will distort the coloration and produce an image with incorrect and de-saturated color.

A common method for preventing these difficulties is to use ionically colored glass or a thin-film optical coating on glass to create an optical element which passes visible light (typically from 380 nm to 780 nm) and blocks the IR. This element can be placed in front of the taking lens, located within the lens system, or it can be incorporated into the imager package. The principle disadvantages to this approach are cost and added system complexity. The cost of an ionically colored glass element can be approximately $1.50 to $2.00 in high volume. Thin film coatings can be implemented at somewhat lower cost (approximately $0.50 to $1.00 in volume), but suffer from the additional disadvantage of exhibiting a spectral shift as a function of angle. Thus, in an imaging system they do not provide a uniform transmittance characteristic from the center of the image field to the edge. Both filter types add to the system complexity by introducing an extra piece-part which must be assembled into the imaging system.

It can therefore be desirable to provide for an imaging system without an IR blocking filter in which IR does not appreciably effect the resulting image signal.

BRIEF DESCRIPTION OF THE DRAWINGS

FIGS. 5–7 illustrate tiling patterns for color sensor arrays.

DETAILED DESCRIPTION OF EMBODIMENTS

In embodiments of the present invention, the effect of IR upon an image signal is substantially reduced by electronically subtracting signals generated by IR pixel sensors from signals generated by pixel sensors responsive to both IR and visible light. The IR pixel sensors are sensitive to the IR incident upon the array comprising the sensors, and provide the IR component of the image separately from the color channels (e.g., RGB).

The IR sensors can be created using the existing commercial Color Filter Array (CFA) materials, taking advantage of the fact that these materials are transparent to IR radiation. By a simple overlay of two CFA colors (e.g., R,B) that have no overlapping transmittance in the visible portion of the spectrum, it is possible to create a composite filter element which blocks the visible light and transmits only IR. If two filters are used to form the composite filter, then each of the two filters has a visible radiation pass spectrum that is disjoint from the other, so that there is substantially no transmittance of visible light through the resulting composite filter formed from the combination of the two filters. If more than two filters are used, then each filter has a visible radiation pass spectrum such that the resulting composite filter is substantially opaque to visible light. This composite filter element is thus an IR pass filter, because each of the component filters used to form the composite filter is substantially transparent to IR.

Figure 1:
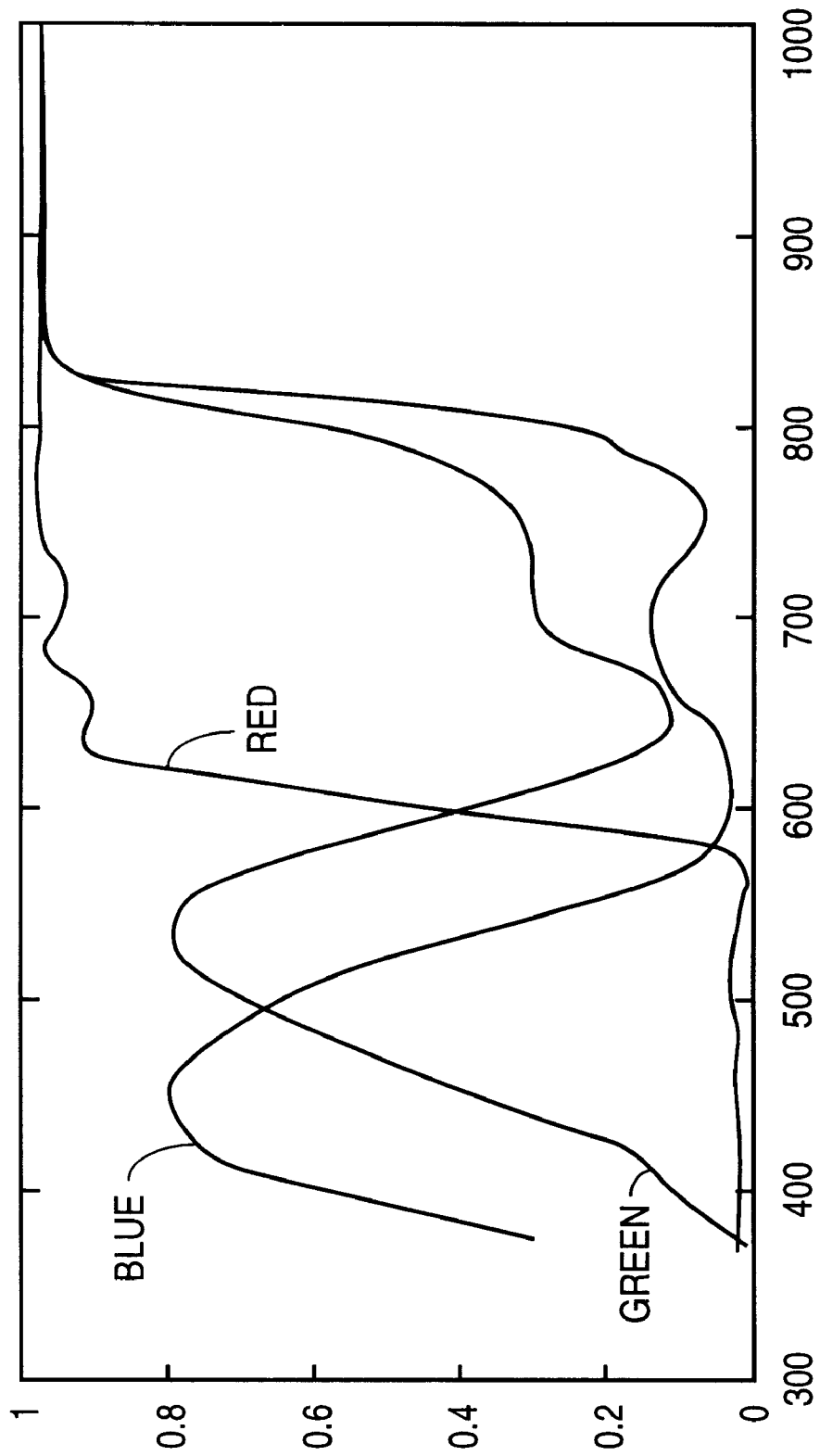
FIG. 1 illustrates the transmittance characteristics for conventional red, green, and blue CFA filters.
Figure 2:
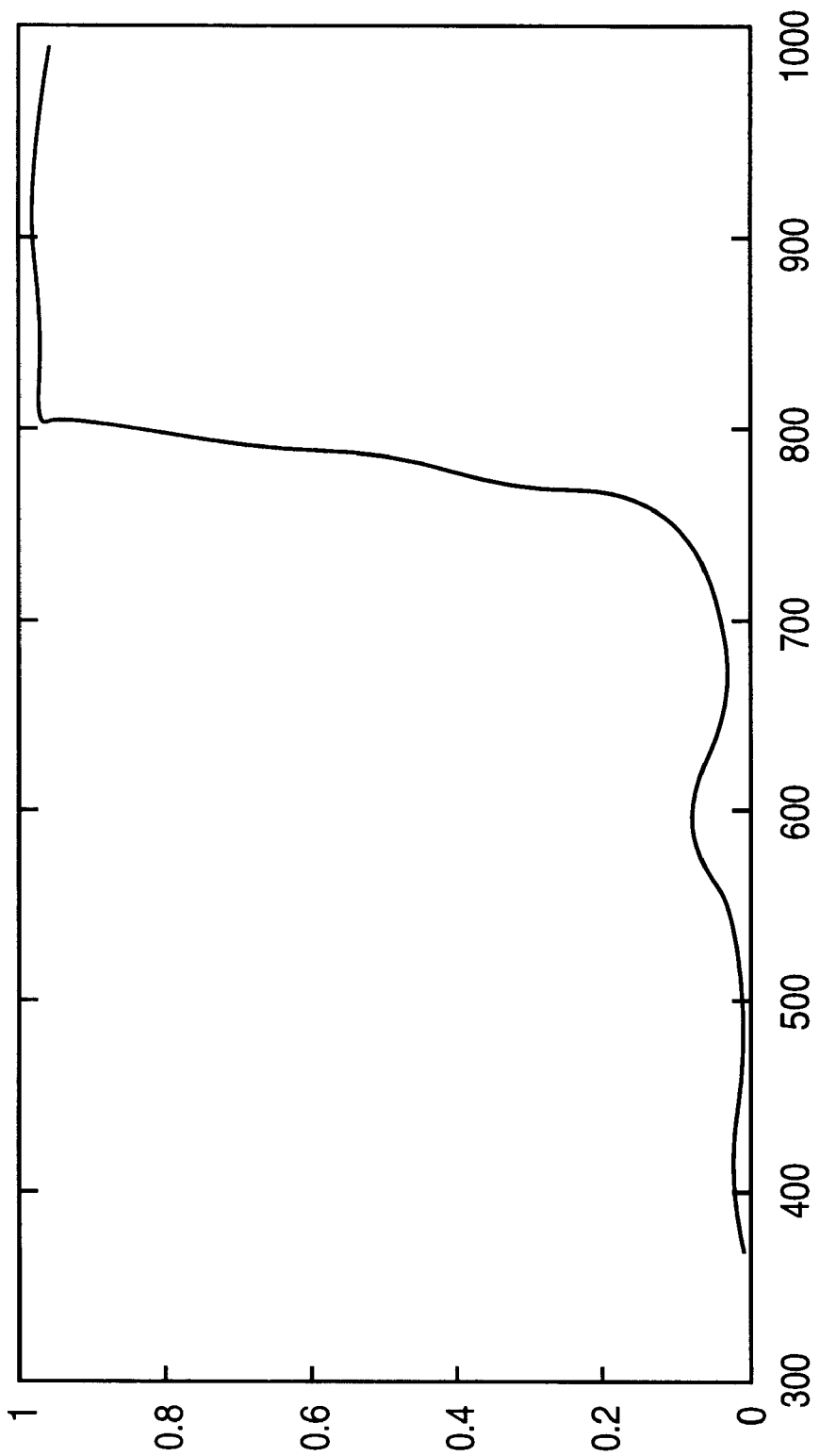
FIG. 2 illustrates the transmittance characteristics of an IR pass filter comprising red and blue CFA filters.

As an example, FIG. 1 shows the transmittance characteristics for conventional red, green, and blue CFA (pigmented acrylate) filters. Note that each filter is substantially transparent to IR. By overlaying red and blue CFA filters, the resulting transmittance of the composite IR pass filter is indicated in FIG. 2, which shows that the visible spectrum is substantially blocked.

The IR pass filter is used to create an IR sensitive pixel, or IR pixel sensor, by depositing the constituent filters making up the IR pass filter over a pixel circuit. This deposition can be accomplished by photo-lithographic techniques well known to the semiconductor industry. A pixel circuit is any circuit which absorbs radiation and provides a signal indicative of the absorbed radiation. For example, the pixel circuit may comprise a photo diode, where photons absorbed by the photo diode generate electron-hole pairs, along with additional circuits to provide an electrical signal, either a voltage or current signal, indicative of the number of photons absorbed by the photo diode.

Figure 3:
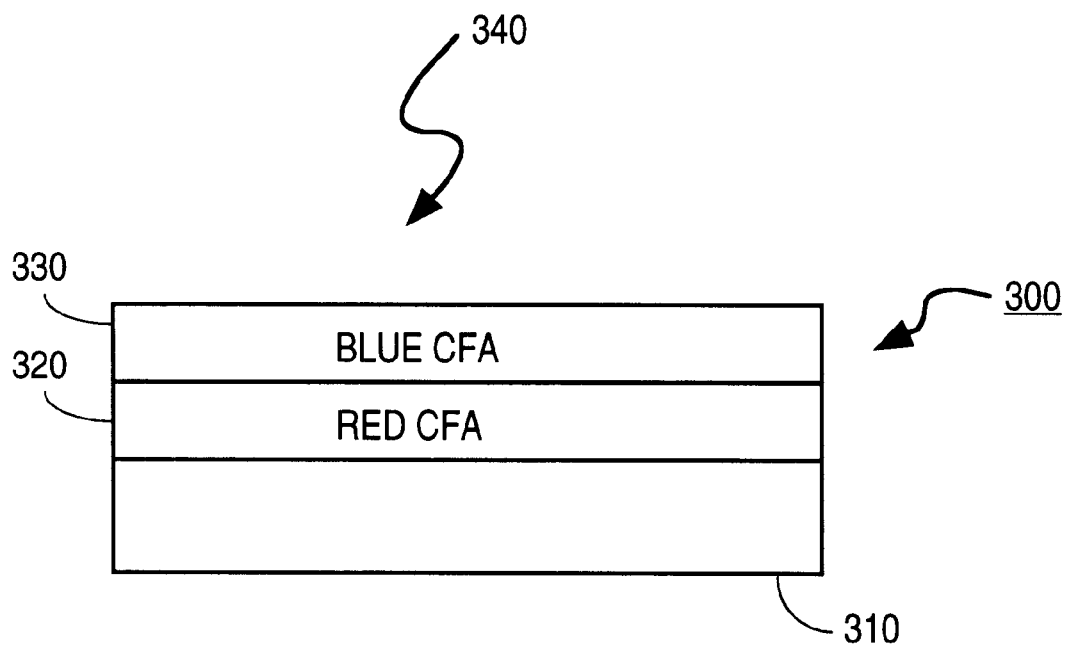
FIG. 3 is a simplified cross-sectional view of a pixel circuit with red and blue CFA filters deposited over the pixel circuit.

In one embodiment, FIG. 3 illustrates a simplified cross-sectional view of an IR pixel sensor 300, comprising pixel circuit 310 with red CFA 320 and blue CFA 330 deposited over pixel circuit 310. Photons in the visible region, incident upon the pixel circuit as pictorially indicated by direction 340, are substantially blocked or prevented from being absorbed by pixel circuit 310.

A preferred embodiment will use an imaging array with four types of pixel sensors: three color (e.g., RGB) types and one IR type, all fabricated with commercially available CFA materials. Such an embodiment would provide four channels, or four types of signals. One such embodiment is indicated in Table I, where the spectrum measured for each channel or pixel type is indicated.

TABLE I

Spectrums for four output channels

| Output Channels | Spectrum |
| --- | --- |
| Channel 1 | Red + IR |
| Channel 2 | Green + IR |

TABLE I-continued

Spectrums for four output channels

| Output Channels | Spectrum |
|---|---|
| Channel 3 | Blue + IR |
| Channel 4 | IR Only |

Figure 4:
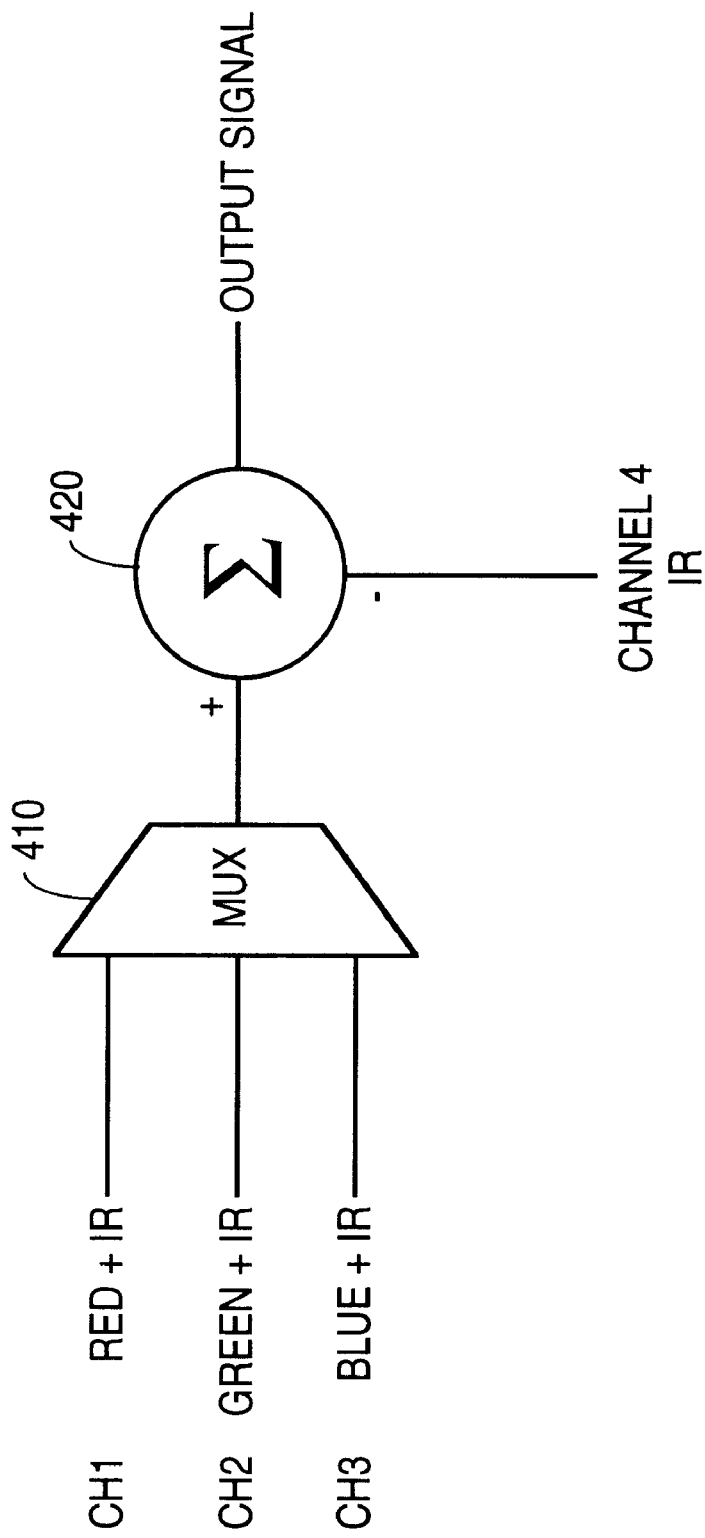
FIG. 4 is a simplified, high-level circuit of a differencing circuit for correcting the IR signal in the image signal.

The IR component of the image signal, once known, can be subtracted from the image to give IR corrected color outputs. This is indicated by a high-level circuit as shown in FIG. 4, where the IR signal on channel 4 is subtracted from each of the signals on channels 1–3 by MUX 410 and differencing circuit 420. Clearly, MUX 410 is not needed if three differencing circuits are available to perform subtraction of the IR signal for each color channel.

Figure 5:
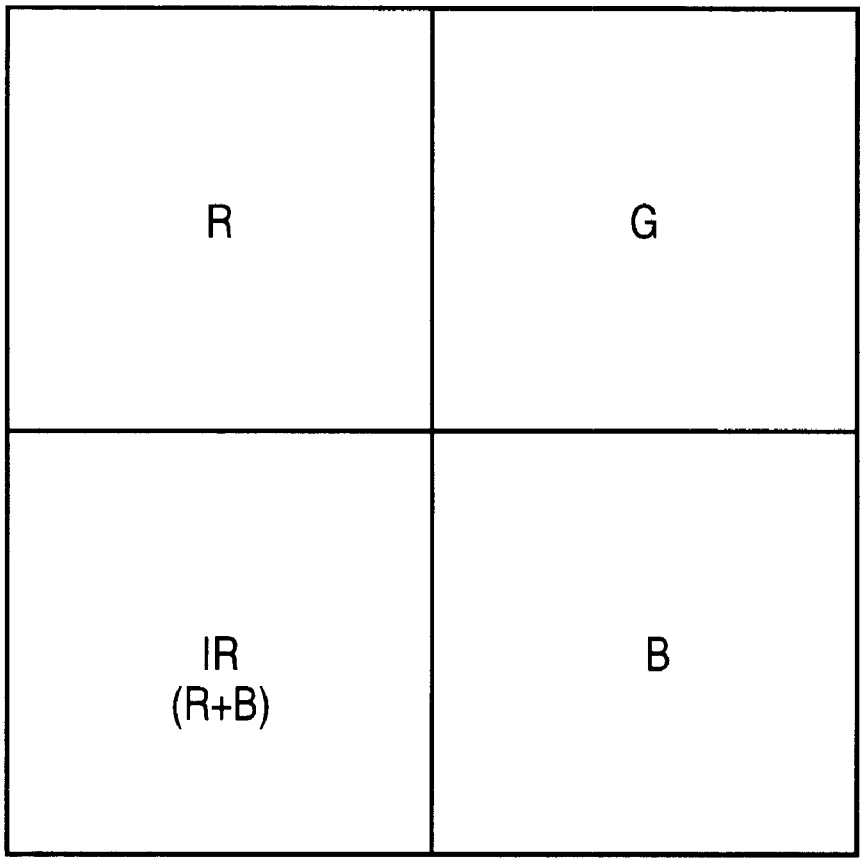
Figure 6:
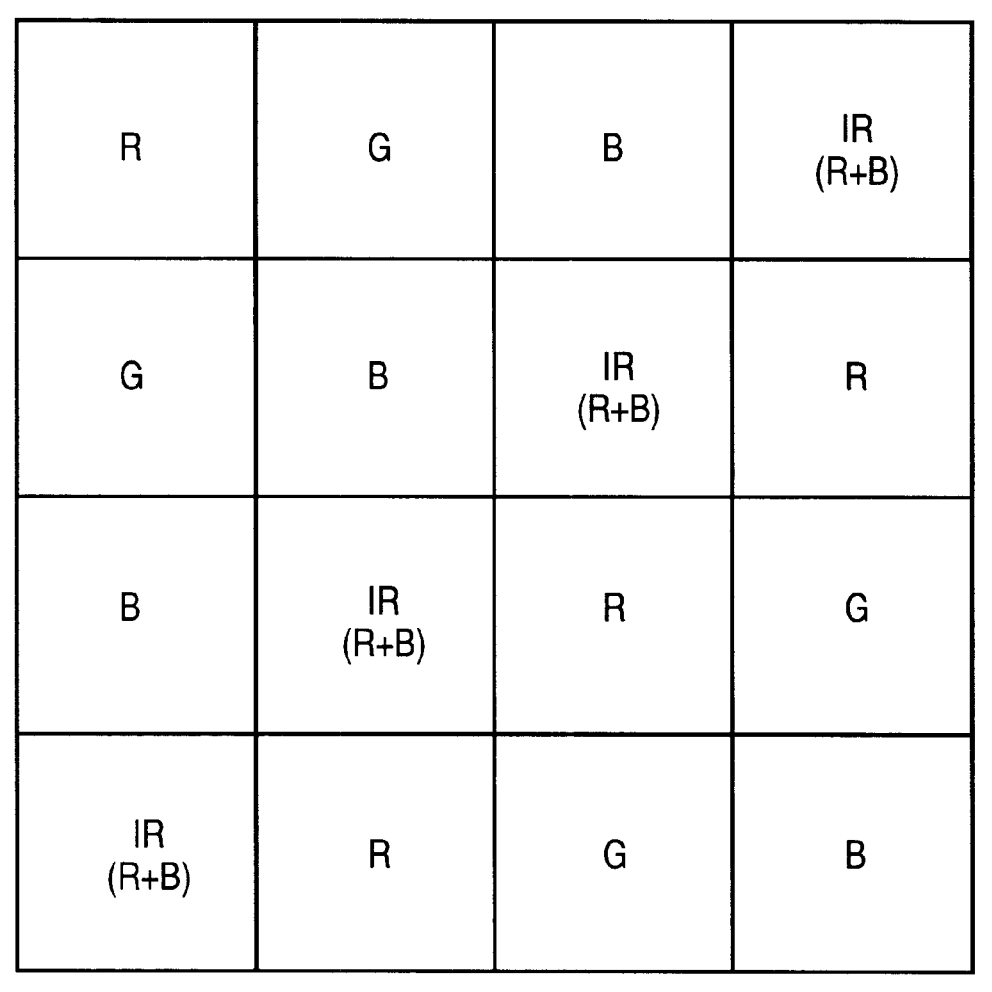
Figure 7:
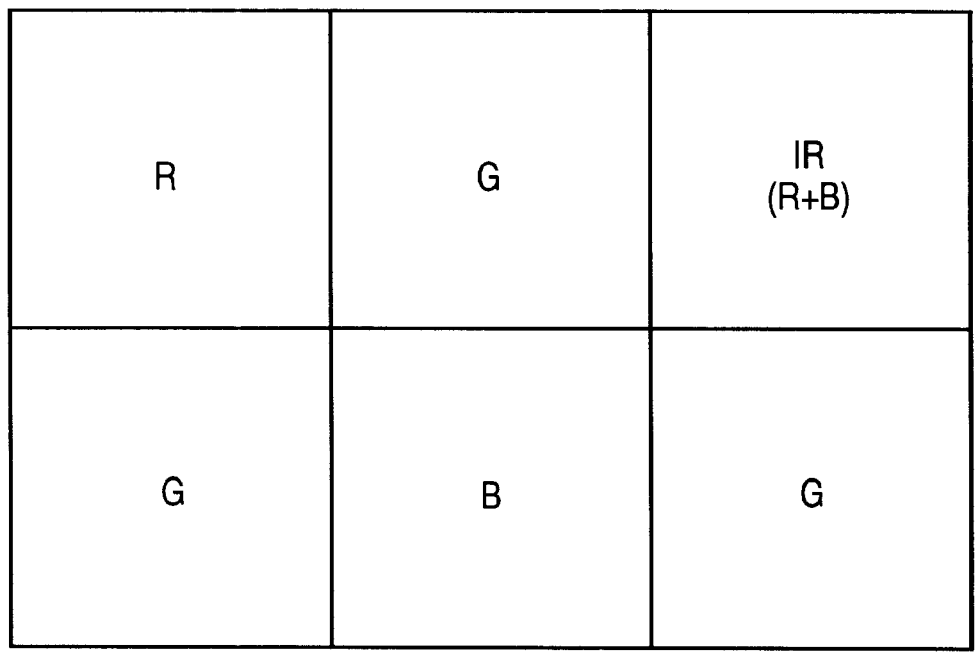
Figure 8:
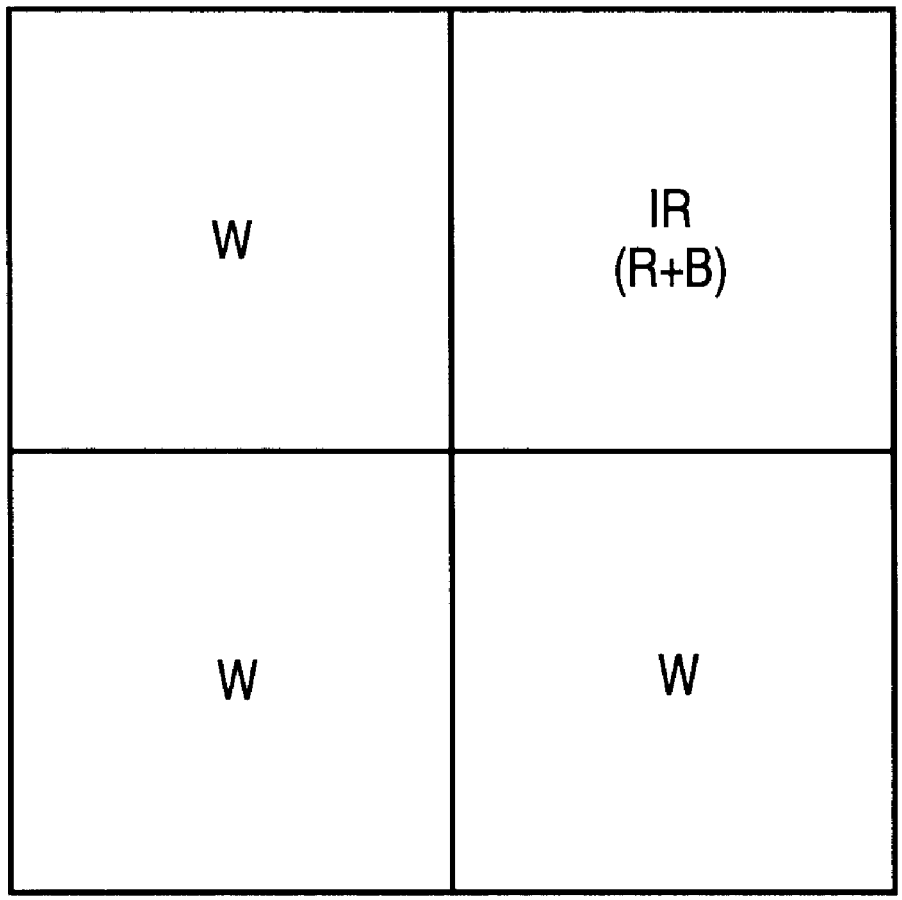
FIG. 8 illustrates a tiling pattern for a monochrome sensor array.

Possible tiling patterns for color images are indicated in FIGS. 5–7, and a tiling pattern for a monochrome image is indicated in FIG. 8, where W denotes a pixel sensor sensitive to the entire visible spectrum. Each pattern shown in FIGS. 5–8 may be considered a unit cell. Unit cells are repeated in a regular fashion throughout an imaging array.

In FIGS. 5–7, pixel sensors labeled R, G, and B indicate pixel sensors utilizing, respectively, red, green, and blue CFA filters. In FIGS. 5–8, pixel sensors labeled IR (R+B) are IR pixel sensors in which the composite IR pass filter comprises red and blue CFA filters.

The pixel sensors need not actually be in physical contact with each other. The pixel circuits making up a pixel sensor will need to be electrically isolated from other pixel circuits. It is to be understood that a first pixel sensor is said to be contiguous to a second pixel sensor if and only if there are no intervening pixel sensors between the first and second pixels. For example, in FIG. 7, the upper left pixel sensor R is contiguous to the lower left pixel sensor G, the upper pixel sensor G, and the pixel sensor B, but it is not contiguous to the lower right pixel sensor G and the IR pixel sensor. Two pixel sensors may be contiguous without actually physically touching each other.

Due to chromatic aberration in the imaging lens system, the IR component of an imaged scene may not be in sharp focus. This is actually an advantage to the embodiments disclosed here because it implies that it is not necessary to sample the IR component with high spatial frequency. This is reflected in the tiling patterns indicated by FIGS. 7 and 8 for color and monochrome imagers, respectively.

An imaging array with IR pixel sensors, whether monochrome or color, may be used in a second mode as an IR imaging array, where only the signals from the IR pixel sensors are utilized to form an IR image. Thus, imaging arrays made according to the embodiments disclosed here may be configured as dual mode imaging arrays, providing either an IR corrected visible image or an IR image.

Embodiments with other color systems may be realized, such as cyan, magenta and yellow (CMY) systems and magenta, white, and yellow (MWY) systems. In the case of the CMY color system, it would be necessary to overlay all three colors to block visible light. The approach could be extended to the MWY color system as well, but would require additional processing to add a third color (e.g. blue or cyan). This color is required to enable complete blocking of the visible light in an IR sensing pixel. Various modifications may be made to the above described embodiments without departing from the scope of the invention as defined below.

What is claimed is:

1. An imager to provide a plurality of electrical signals in response to electromagnetic radiation incident upon the imager, the imager comprising:
   a plurality of pixel sensors, wherein each pixel sensor belonging to the plurality of pixel sensors comprises a filter substantially transparent to infrared radiation and having a visible radiation pass spectrum and wherein each pixel sensor is to provide a signal responsive to electromagnetic radiation propagating through its filter;
   an infrared pixel sensor comprising:
      a pixel circuit; and
      a plurality of filters to form a composite filter, each filter belonging to the plurality of filters substantially transparent to infrared radiation and having a visible radiation pass spectrum, wherein the composite filter is substantially opaque to visible radiation, wherein the composite filter is proximal to the pixel circuit so as to substantially prevent visible radiation from propagating through the composite filter and being absorbed by the pixel circuit, and wherein the infrared pixel sensor is to provide an electrical signal indicative of electromagnetic radiation propagating through the composite filter; and
   a differencing circuit coupled to the plurality of pixel sensors and the infrared pixel sensor to provide image signals, each image signal indicative of the difference between the signal provided by the infrared pixel sensor and one of the signals provided by the pixel sensors.

2. A method for providing an image signal, the method comprising:
   providing a plurality of pixel sensors, wherein each pixel sensor belonging to the plurality of pixel sensors comprises a filter substantially transparent to infrared radiation and having a visible radiation pass spectrum and wherein each pixel sensor is to provide a signal responsive to electromagnetic radiation propagating through its filter;
   providing an infrared pixel sensor comprising:
      a pixel circuit; and
      a plurality of filters to form a composite filter, each filter belonging to the plurality of filters substantially transparent to infrared radiation and having a visible radiation pass spectrum, wherein the composite filter is substantially opaque to visible radiation, wherein the composite filter is proximal to the pixel circuit so as to substantially prevent visible radiation from being absorbed by the pixel circuit, and wherein the infrared pixel sensor is to provide an electrical signal indicative of electromagnetic radiation propagating through the composite filter; and
   differencing the signal provided by the infrared pixel sensor with the signals provided by the pixel sensors.

3. A unit cell for a tiling pattern in a sensor array, the unit cell comprising:
   a red pixel sensor so as to be responsive to infrared radiation and substantially only the red portion of the visible spectrum;
   a first green pixel sensor so as to be responsive to infrared radiation and substantially only the green portion of the visible spectrum
   a second green pixel sensor so as to be responsive to infrared radiation and substantially only the green portion of the visible spectrum;
   a blue pixel sensor so as to be responsive to infrared radiation and substantially only the blue portion of the visible spectrum, wherein the red, first green, second green, and blue pixel sensors are contiguous to each other;

an infrared pixel sensor so as to be responsive to infrared radiation and not substantially responsive to visible radiation; and a third green pixel sensor so as to be responsive to infrared radiation and substantially only the green portion of the visible spectrum, wherein the second green, blue, third green, and infrared pixel sensor are contiguous to each other, such that the infrared and green pixel sensors are not contiguous to the red and first green pixel sensors.

4. The unit cell as set forth in claim 3, wherein the infrared pixel sensor comprises:

a pixel circuit;

a first filter substantially transparent to infrared radiation and having a first visible radiation pass spectrum; and a second filter substantially transparent to infrared radiation and having a second visible radiation pass spectrum, wherein the first and second visible radiation pass spectrums are substantially relatively disjoint, wherein the first and second filters are proximal to the pixel circuit so as to substantially prevent visible radiation from propagating through the first and second filters to the pixel circuit.

5. The unit cell as set forth in claim 4, wherein the first and second filters comprise color filter array material.

6. The unit cell as set forth in claim 5, wherein the first and second filters are disposed proximal to the pixel circuit by photo-lithography methods.

7. A camera comprising:

a sensor array comprising a unit cell, the unit cell comprising:

a red pixel sensor, a first green pixel sensor, a second green pixel sensor, and a blue pixel sensor, wherein the red, first green, second green, and blue pixel sensors are responsive to infrared radiation and are contiguous to each other;

an infrared pixel sensor so as to be responsive to infrared radiation and not substantially responsive to visible radiation; and a third green pixel sensor responsive to infrared radiation, wherein the second green, blue, third green, and infrared pixel sensors are contiguous to each other, such that the infrared and green pixel sensors are not contiguous to the red and first green pixel sensors.

8. An imaging system comprising:

a plurality of infrared pixel sensors, a plurality of red pixel sensors, a plurality of green pixel sensors, and a plurality of red pixel sensors obtained by repeating a unit cell, the unit cell comprising:

a red pixel sensor, a first green pixel sensor, a second green pixel sensor, and a blue pixel sensor, wherein the red, first green, second green, and blue pixel sensors are responsive to infrared radiation and are contiguous to each other;

an infrared pixel sensor so as to be responsive to infrared radiation and not substantially responsive to visible radiation; and a third green pixel sensor responsive to infrared radiation, wherein the second green, blue, third green, and infrared pixel sensors are contiguous to each other, such that the infrared and green pixel sensors are not contiguous to the red and first green pixel sensors; and a differencing circuit coupled to the pluralities of infrared, red, green, and blue pixel sensors to provide an image signal by subtracting out signals provided by the plurality of infrared pixel sensors.

* * * * *